United States Patent
Sheem et al.

(10) Patent No.: US 8,691,442 B2
(45) Date of Patent: Apr. 8, 2014

(54) NEGATIVE ACTIVE MATERIAL COMPRISING CARBON CORE PARTICLES COATED WITH THIN FILM COVERING FOR A RECHARGEABLE LITHIUM BATTERY, METHOD OF PREPARING THE SAME, AND RECHARGEABLE LITHIUM BATTERY INCLUDING THE SAME

(75) Inventors: Kyeu-Yoon Sheem, Yongin-si (KR); Bok-Hyun Ka, Yongin-si (KR); Eui-Hwan Song, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 419 days.

(21) Appl. No.: 12/929,560

(22) Filed: Feb. 1, 2011

(65) Prior Publication Data
US 2012/0040249 A1 Feb. 16, 2012

(30) Foreign Application Priority Data
Aug. 12, 2010 (KR) ........................ 10-2010-0077981

(51) Int. Cl.
*H01M 4/583* (2010.01)
*H01M 4/133* (2010.01)
*H01M 4/134* (2010.01)
*H01B 1/04* (2006.01)
*H01B 1/22* (2006.01)
*B05D 5/12* (2006.01)

(52) U.S. Cl.
USPC ........ 429/231.8; 429/220; 429/223; 252/503; 252/513; 252/514; 427/77

(58) Field of Classification Search
USPC ......... 429/231.8, 231.95, 209, 220, 224, 223; 29/623.1, 623.5; 252/503, 513, 514; 427/77
See application file for complete search history.

(56) References Cited

U.S. PATENT DOCUMENTS 5,595,838 A * 1/1997 Yamada et al. ................ 429/209
5,888,671 A * 3/1999 Yamasaki et al. ............. 429/232

(Continued)

FOREIGN PATENT DOCUMENTS

JP 11111298 A * 4/1999 .............. H01M 4/62
JP 2001-200027 7/2001

(Continued)

OTHER PUBLICATIONS

Machine Translation of: KR 1020010025881A, Choi et al., Apr. 6, 2001.*

(Continued)

*Primary Examiner* — Kenneth Douyette
(74) *Attorney, Agent, or Firm* — Lee & Morse, P.C.

(57) ABSTRACT

A negative active material for a rechargeable lithium battery, a method of preparing the same, and a rechargeable lithium battery including the same, the negative active material including carbon core particles; a metallic material on the carbon core particles; and a carbon thin film covering the carbon core particles and the metallic material, wherein the carbon core particles have an interplanar spacing (d002) of about 0.34 nm to about 0.40 nm at a (002) plane measured by X-ray diffraction (XRD) using a CuKα ray, and the carbon thin film has a thickness of about 1 nm to about 500 nm.

20 Claims, 1 Drawing Sheet

(56) References Cited

U.S. PATENT DOCUMENTS

| | | | |
|---|---|---|---|
| 5,908,715 A * | 6/1999 | Liu et al. | 429/217 |
| 6,355,377 B1 | 3/2002 | Sheem et al. | |
| 7,074,521 B2 | 7/2006 | Sheem et al. | |
| 2002/0076614 A1 * | 6/2002 | Yoon et al. | 429/231.95 |
| 2009/0136849 A1 | 5/2009 | Yue et al. | |
| 2009/0269669 A1 * | 10/2009 | Kim et al. | 429/231.8 |
| 2010/0009260 A1 * | 1/2010 | Tanaka et al. | 429/231.8 |
| 2010/0136432 A1 | 6/2010 | Kim | |

FOREIGN PATENT DOCUMENTS

| | | |
|---|---|---|
| JP | 2001-253844 | 9/2001 |
| KR | 2000-0056985 A | 9/2000 |
| KR | 10 2001-0025881 A | 4/2001 |
| KR | 10 2001-0087559 A | 9/2001 |
| KR | 10 2005-0064061 A | 6/2005 |
| KR | 10 2009-0010361 A | 1/2009 |
| KR | 10 2009-0090033 A | 8/2009 |
| KR | 10 2009-0094575 A | 9/2009 |
| KR | 10 2010-00620 A | 6/2010 |

OTHER PUBLICATIONS

Machine Translation of: JP 11/111298A, Higashiyama et al., Apr. 23, 1999.*

Korean Office Action in KR 10-2010-0077981, dated Dec. 19, 2011 (Sheem, et al.).

Notice of Allowance in KR 10-2010-0077981, dated Aug. 31, 2012 (Sheem, et al.).

* cited by examiner

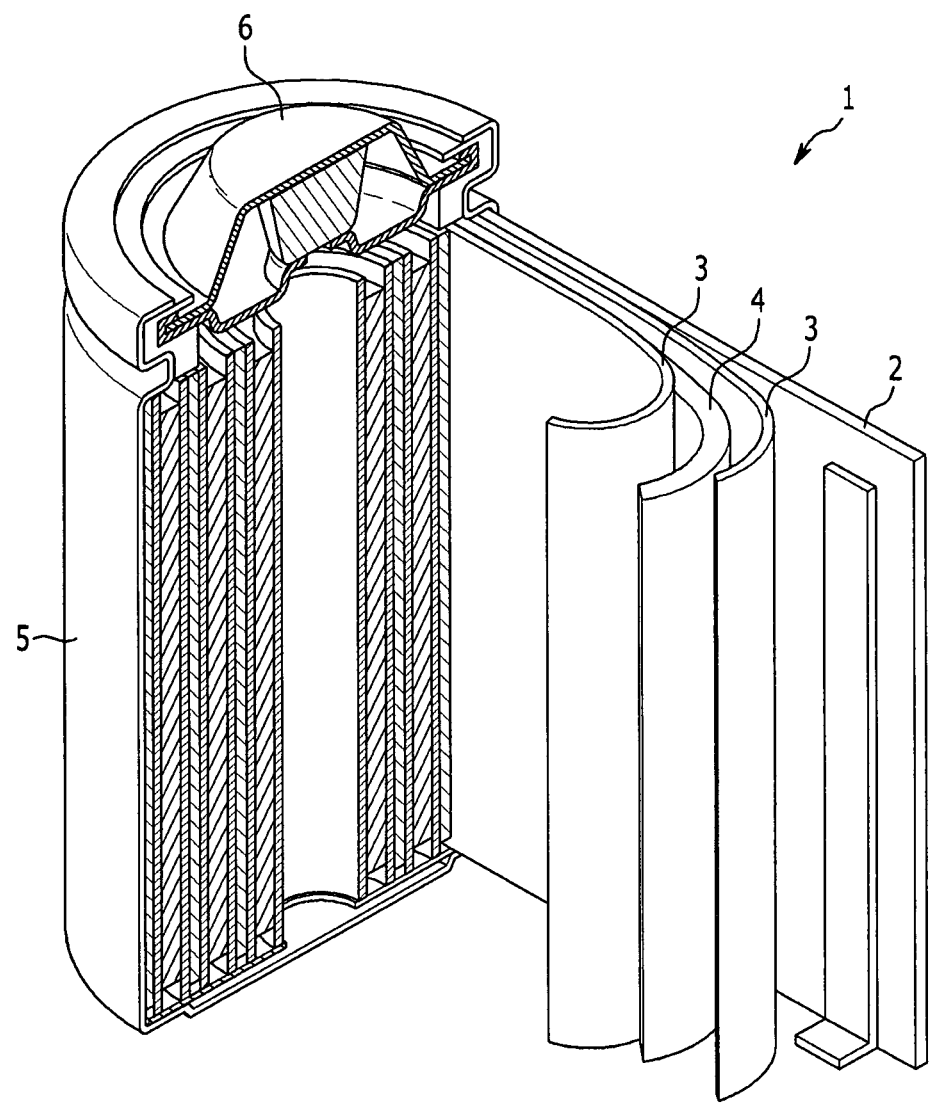

NEGATIVE ACTIVE MATERIAL COMPRISING CARBON CORE PARTICLES COATED WITH THIN FILM COVERING FOR A RECHARGEABLE LITHIUM BATTERY, METHOD OF PREPARING THE SAME, AND RECHARGEABLE LITHIUM BATTERY INCLUDING THE SAME

BACKGROUND

1. Field

Embodiments relate to a negative active material for a rechargeable lithium battery, a method of manufacturing the same, and a rechargeable lithium battery including the same.

2. Description of the Related Art

Lithium rechargeable batteries have recently drawn attention as a power source of small portable electronic devices. Lithium rechargeable batteries may use an organic electrolyte solution and may have twice the discharge voltage of a conventional battery using an alkali aqueous solution, and accordingly may have high energy density.

Positive active materials of a rechargeable lithium battery may include lithium-transition element composite oxides capable of intercalating lithium, e.g., $LiCoO_2$, $LiMn_2O_4$, $LiNi_{1-x}Co_xO_2$ ($0<x<1$), and the like.

As for negative active materials of a rechargeable lithium battery, various carbon-based materials, e.g., artificial graphite, natural graphite, and hard carbon, which may all intercalate and deintercalate lithium ions, have been used. Since graphite may have a low discharge potential relative to lithium, e.g., −0.2 V, a battery using the graphite as a negative active material may have a high discharge potential of 3.6 V and excellent energy density.

Furthermore, graphite may help ensure a long cycle life for a battery due to its outstanding reversibility. A carbon material having a crystalline structure that may be changed into graphite is referred to as soft carbon; and a carbon material that cannot be changed is referred to as hard carbon.

Generally, soft carbon may be prepared using processing residue of petroleum or coal and may be inexpensive. On the other hand, hard carbon may be relatively expensive because it is prepared by performing a heat treatment on resin. Since soft carbon may be more likely to be transformed into graphite than hard carbon, it has higher crystallinity than hard carbon.

SUMMARY

Embodiments are directed to a negative active material for a rechargeable lithium battery, a method of manufacturing the same, and a rechargeable lithium battery including the same.

At least one of the above and other features and advantages may be realized by providing a negative active material for a rechargeable lithium battery, the negative active material including carbon core particles; a metallic material on the carbon core particles; and a carbon thin film covering the carbon core particles and the metallic material, wherein the carbon core particles have an interplanar spacing (d002) of about 0.34 nm to about 0.40 nm at a (002) plane measured by X-ray diffraction (XRD) using a CuKα ray, and the carbon thin film has a thickness of about 1 nm to about 500 nm.

The carbon core particles may include soft carbon, hard carbon, or a combination thereof.

The carbon thin film may have a thickness of about 5 nm to about 350 nm.

The carbon thin film may have a thickness of about 5 nm to about 100 nm.

The metallic material may include a metal including at least one of copper (Cu), nickel (Ni), silver (Ag), gold (Au), and platinum (Pt).

The metallic material may include a metallic material having a particle size of about 1 nm to about 100 nm, and the metallic material having the particle size of about 1 nm to about 100 nm may be included in an amount of more than about 80 wt. %, based on an entire weight of the metallic material.

At least one of the above and other features and advantages may also be realized by providing a method for preparing a negative active material for a rechargeable lithium battery, the method including providing a metallic material precursor on a surface of carbon; coating a surface of the carbon and the metallic material precursor with a carbon precursor; and heat treating the metallic material precursor and the carbon precursor at a temperature of about 700° C. to about 1500° C. under an inert atmosphere for about 60 minutes to about 500 minutes.

Heat treating the metallic material precursor and the carbon precursor may include increasing the temperature to about 700° C. to about 1500° C. at a temperature increasing rate of about 1° C./min to about 5° C./min.

The carbon may include soft carbon, hard carbon, or a combination thereof.

Providing the metallic material precursor on the surface of carbon may include mixing the carbon with the metallic material precursor using a dry combination method.

The dry combination method may include a mechanochemical method, a dry milling method, or a combination thereof.

The mechanochemical method may include a method of using mechanofusion (MF) equipment, a method using hybridizer equipment, a method using thetacomposer equipment, or a combination thereof.

Providing the metallic material precursor on the surface of carbon may include mixing the carbon and the metallic material precursor in a solution, and heat treating the solution including the mixed carbon and metallic material precursor under an inert atmosphere for about 40 minutes to about 90 minutes at a temperature of about 250° C. to about 350° C.

The metallic material precursor may include an oxide or a salt of a metal including at least one of copper (Cu), nickel (Ni), silver (Ag), gold (Au), and platinum (Pt).

The metallic material precursor may include copper oxide (CuO), copper nitrate trihydrate ($Cu(NO_3)_2 \cdot 3H_2O$), nickel sulfate hexahydrate ($NiSO_4 \cdot 6H_2O$), or a combination thereof.

Heat treating the metallic material precursor and the carbon precursor may include transforming the carbon precursor into a carbon thin film. An amount of the resulting carbon is corresponded to about 0.3 wt % to 1 wt %, based on a total weight of the carbon precursor.

The carbon precursor may include citric acid, dihydroxy naphthalene, or a combination thereof.

At least one of the above and other features and advantages may also be realized by providing a rechargeable lithium battery including a negative electrode including a negative active material for a rechargeable lithium battery according to an embodiment; a positive electrode; and an electrolyte.

BRIEF DESCRIPTION OF THE DRAWING

The above and other features and advantages will become more apparent to those of ordinary skill in the art by describing in detail exemplary embodiments with reference to the attached drawing, in which:

FIG. 1 illustrates a schematic view of a rechargeable lithium battery according to an embodiment.

DETAILED DESCRIPTION

Korean Patent Application No. 10-2010-0077981, filed on Aug. 12, 2010, in the Korean Intellectual Property Office, and entitled: "Negative Active Material for Rechargeable Lithium Battery, Method of Preparing the Same, and Rechargeable Lithium Battery Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

A negative active material for a rechargeable lithium battery according to an embodiment may include, e.g., carbon core particles; a metallic material on the carbon core particles; and a carbon thin film covering the carbon core particles and the metallic material. The carbon core particles may have an interplanar spacing (d002) of about 0.34 nm to about 0.40 nm at a (002) plane measured by X-ray diffraction (XRD) using a CuKα ray. In an implementation, the carbon thin film may have a thickness of about 1 nm to about 500 nm.

Maintaining the interplanar spacing (d002) from the (002) plane of the carbon core particle at about 0.34 nm to about 0.40 nm may help ensure that intercalation and deintercalation of lithium ions is easily performed easily and that high-rate charge and discharge characteristics are effectively improved.

The carbon core particle may include, e.g., soft carbon, hard carbon, or a combination thereof. In an implementation, soft carbon may be used for the carbon core particles.

Hereafter, the carbon core particles including soft carbon is described in detail. However, the embodiments are not limited thereto.

The soft carbon may be amorphous carbon; and lithium ions may be accumulated in a space between a carbon crystal edge face and microcrystals of soft carbon. Lithium ions may be diffused into an interior of the carbon after charge transfer is performed at an interface by passing through a solid electrolyte interface (SEI) of a negative active material. Although the soft carbon, e.g., amorphous carbon, may have lower crystallinity than crystalline carbon, e.g., graphite, crystals of the soft carbon may have a better orientation and may have a better diffusion rate of lithium ions. Accordingly, it may be advantageous to prepare soft carbon as a flow type than to prepare it as a mosaic type of mesophase pitch.

The metallic material may decrease resistance at the interface when the lithium ions transferred from outside are diffused into the inside of the carbon so the lithium ions may be easily transferred.

The metallic material may include a metal including at least one of copper (Cu), nickel (Ni), silver (Ag), gold (Au), and platinum (Pt). A metallic material having a particle size of about 1 nm to about 100 nm may be included in an amount of about 80 wt. % or more, based on a total weight of the metallic material.

As opposed to graphite, the soft carbon having a network structure may contract and expand. When the metallic material breaks off from a surface of the soft carbon during the intercalation and deintercalation reactions of lithium, an internal short-circuit may occur during the repeated charge and discharge cycles and thus cycle-life of a battery may be reduced. Accordingly, the metallic material may adhere to the surface of the soft carbon. The carbon thin film may facilitate adhesion of the metallic material to the soft carbon. Maintaining the thickness of the carbon thin film at an appropriate thickness on the external surface of the soft carbon may help ensure that the metallic material is not closed off at an inside of the coating and is not isolate from the interface between the soft carbon and the electrolyte. Accordingly, it may be appropriate to have the metallic material adhere using, e.g., an organic acid or other carbon precursor having a low molecular weight, to make the coating have an ideal thickness such that the metallic material adheres.

The carbon thin film may have a thickness of about 1 nm to about 500 nm. Maintaining the thickness of the carbon thin film at about 1 nm to about 500 nm may help ensure that the ions are easily transmitted so as to effectively improve the electrical conductivity and to suppress the decrease in resistance by the metallic material. In an implementation, the carbon thin film may have a thickness of about 5 nm to about 350 nm. In another implementation, the carbon thin film may have a thickness of about 5 nm to about 100 nm.

When the metallic material is supported by the surface of the negative active material, conductivity at the surface may be improved and an electron distribution on the surface may increase. Thus, reactivity may be increased at the interface; and the increased reactivity may decrease the resistance against charge transfer inside an active material, which may be favorable for a rapid charge/discharge operation.

Another embodiment provides a method for preparing a negative active material for a rechargeable lithium battery. The method may include positioning or providing a metallic material precursor on a surface of carbon; coating surfaces of the carbon and the metallic material precursor with a carbon precursor; and then heat treating the resultant structure. The heat treating may include heat treating at a temperature of about 700° C. to about 1500° C. under an inert atmosphere for about 60 minutes to about 500 minutes. In an implementation, the heat treatment may include increasing a temperature of the metallic material precursor and the carbon precursor under an inert atmosphere from about 700° C. to about 1500° C. at a temperature increasing rate of about 1° C./min to about 5° C./min.

The carbon may include, e.g., soft carbon, hard carbon, or a combination thereof. In an implementation, the carbon is soft carbon.

Providing the metallic material precursor on the surface of the carbon may include mixing the carbon and the metallic material precursor. Thus, the metallic material precursor may be evenly provided on the surface of the carbon. The metallic material precursor may include oxides or salts of a metal including at least one of copper (Cu), nickel (Ni), silver (Ag), gold (Au), and platinum (Pt). For example, the metallic material precursor may include copper oxide (CuO), copper nitrate trihydrate ($Cu(NO_3)_2 \cdot 3H_2O$), nickel sulfate hexahydrate ($NiSO_4 \cdot 6H_2O$), or a combination thereof, but is not limited thereto.

Providing the metallic material precursor on the surface of the carbon may be performed using a dry combination method. The dry combination may include, e.g., a mechanochemical method, a dry milling method, or a combination thereof. The mechanochemical method may include, e.g., a method using mechanofusion (MF) equipment, a method using hybridizer equipment, a method using thetacomposer equipment, or a combination thereof, but is not limited thereto.

In an implementation, providing the metallic material precursor on the surface of the carbon may be performed using a wet combination method. The wet combination method may include mixing the carbon and the metallic material precursor in a solution and then performing a heat treatment under an inert atmosphere for about 40 minutes to about 90 minutes at a temperature of about 250° C. to about 350° C.

Thereafter, the carbon precursor is coated on the surface of the carbon and the metallic material precursor. The carbon precursor is transformed into a carbon and an amount of the resulting carbon is corresponded to about 0.3 wt % to 1 wt %, based on a total weight of the carbon precursor. This transformation may be achieved by the heat treatment at about 700° C. to about 1500° C. at, e.g., the temperature increasing rate of about 1° C./min to about 5° C./min, under the inert atmosphere for about 60 minutes to about 500 minutes. Thus, the carbon precursor may form a thin carbon thin film in the heat treatment. The carbon precursor may include, e.g., citric acid, dihydroxy naphthalene, or a combination thereof, but is not limited thereto.

As described above, the metallic material precursor and the carbon precursor may heat treated at about 700° C. to about 1500° C. under the inert atmosphere for about 60 minutes to about 500 minutes. During the heat treatment, the carbon precursor may be transformed into the carbon thin film having, e.g., conductivity, and may cover defects on a surface of the core particles so as to decrease a specific surface area thereof. Thus, growth of an SEI coating film may be suppressed. Simultaneously reduced metallic materials, e.g. metal particulate, may improve conductivity on the surface of the negative active material for a rechargeable lithium battery and may decrease charge transfer resistance of lithium ions.

Another embodiment provides a rechargeable lithium battery. The rechargeable lithium battery may include a negative electrode including the negative active material of an embodiment, a positive electrode, and an electrolyte.

FIG. 1 illustrates a schematic view of rechargeable lithium battery according to an embodiment.

Referring to FIG. 1, the rechargeable lithium battery 1 according to the present embodiment may include a battery cell including a positive electrode 4, a negative electrode 2 facing the positive electrode 4, a separator 3 interposed between the positive electrode 4 and the negative electrode 2, and an electrolyte (not shown) impregnating the positive electrode 4, the negative electrode 2, and the separator 3, a battery case 5, and a sealing member 6 sealing the battery case 5.

The negative electrode 2 may include a negative active material layer including the negative active material of an embodiment and a current collector supporting the negative active material layer.

The negative active material layer may include about 95 wt % to about 99 wt % of the negative active material, based on a total weight of the negative active material layer.

The negative active material layer may include, e.g., a binder. In an implementation, the negative active material layer may include, e.g., a conductive material. The negative active material layer may include about 1 wt % to about 5 wt % of the binder, based on the total weight of the negative active material layer. In addition, when the negative active material layer includes the conductive material, the negative active material layer may include about 90 wt % to about 98 wt % of the negative active material, about 1 wt % to about 5 wt % of the binder, and about 1 wt % to about 5 wt % of the conductive material.

The binder may improve properties for binding active material particles with one another and with a current collector. The binder may include, e.g., polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoro ethylene, polyvinylidene fluoride, polyethylene, polypropylene, a styrene-butadiene rubber, an acrylated styrene-butadiene rubber, an epoxy resin, nylon, and the like, but are not limited thereto.

The conductive material may be included to improve electrode conductivity. Any suitable electrically conductive material may be used as a conductive material unless it causes an undesirable chemical change. The conductive material may include, e.g., a carbon-based material such as natural graphite, artificial graphite, carbon black, acetylene black, ketjen black, carbon fiber, and the like; a metal-based material including a metal powder or a metal fiber including copper, nickel, aluminum, silver, and the like; a conductive polymer such as polyphenylene derivative, and the like; or a mixture thereof.

The current collector may include, e.g., a copper foil, a nickel foil, a stainless steel foil, a titanium foil, a nickel foam, a copper foam, a polymer substrate coated with a conductive metal, or combinations thereof.

The positive electrode 4 may include a current collector and a positive active material layer on the current collector. The positive active material may include, e.g., lithiated intercalation compounds that reversibly intercalate and deintercalate lithium ions. The positive active material may include, e.g., a composite oxide including at least one of cobalt, manganese, and nickel, as well as lithium. In an implementation, the positive active material may include, e.g., $Li_aA_{1-b}X_bD_2$ ($0.90 \leq a \leq 1.8$, $0 \leq b \leq 0.5$), $Li_aE_{1-b}X_bO_{2-c}D_c$ ($0.90 \leq a \leq 1.8$, $0 \leq b \leq 0.5$, $0 \leq c \leq 0.05$), $Li_aE_{2-b}X_bD_4$ ($0.90 \leq a \leq 1.8$, $0 \leq b \leq 0.5$), $Li_aE_{2-b}X_bO_{4-c}D_c$ ($0.90 \leq a \leq 1.8$, $0 \leq b \leq 0.5$, $0 \leq c \leq 0.05$), $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$), $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$), $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$), $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$), $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$), $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$), $Li_aN-i_bE_cG_dO_2$ ($0.90 \leq a \leq 1.8$, $0 \leq b \leq 0.9$, $0 \leq c \leq 0.5$, $0.001 \leq d \leq 0.1$), $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$), $Li_aNiG_bO_2$ ($0.90 \leq a \leq 1.8$, $0.001 \leq b \leq 0.1$), $Li_aCoG_bO_2$ ($0.90 \leq a \leq 1.8$, $0.001 \leq b \leq 0.1$), $Li_aMnG_bO_2$ ($0.90 \leq a \leq 1.8$, $0.001 \leq b \leq 0.1$), $Li_aMn_2G_bO_4$ ($0.90 \leq a \leq 1.8$, $0.001 \leq b \leq 0.1$), $QO_2$, $QS_2$, $LiQS_2$, $V_2O_5$, $LiV_2O_5$, $LiIO_2$, $LiNiVO_4$, $Li_{(3-f)}J_2(PO_4)_3$ ($0 \leq f \leq 2$), $Li_{(3-f)}Fe_2(PO_4)_3$ ($0 \leq f \leq 2$), and $LiFePO_4$.

In the above Chemical Formulae, A may include Ni, Co, Mn, and/or a combination thereof; X may include Al, Ni, Co, Mn, Cr, Fe, Mg, Sr, V, a rare earth element, and/or a combination thereof; D may include O, F, S, P, and/or a combination thereof; E may include Co, Mn, and/or a combination thereof; T may include F, S, P, and/or a combination thereof; G may include Al, Cr, Mn, Fe, Mg, La, Ce, Sr, V, and/or a combination thereof; Q may include Ti, Mo, Mn, and/or a combination thereof; Z may include Cr, V, Fe, Sc, Y, and/or a combination thereof, and J may include V, Cr, Mn, Co, Ni, Cu, and/or a combination thereof.

The positive active material may include the positive active material with the coating layer, or a compound of the active material and the active material coated with the coating layer.

The coating layer may include a coating element compound including at least one of an oxide and a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may include, e.g. Mg, Al, Co, K, Na, Ca, Si, Ti, V, Sn, G, Ga, B, As, Zr, and/or combinations thereof. The coating process may include any suitable processes as long as it does not cause any adverse side effects on the properties of the positive active material (e.g., spray coating, immersing), which is well known to persons having ordinary skill in this art, so a detailed description thereof is omitted.

The positive active material layer may also include a binder and a conductive material.

The binder may improve binding properties of the positive active material particles to each other and to a current collector. The binder may include at least one of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, a styrene-butadiene rubber, an acrylated styrene-butadiene rubber, an epoxy resin, nylon, and the like, but is not limited thereto.

The conductive material may improve electrical conductivity of the positive electrode. Any suitable electrically conductive material can be used as a conductive agent unless it causes an adverse chemical change. The conductive material may include, e.g., a carbon-based material such as natural graphite, artificial graphite, carbon black, acetylene black, ketjen black, a carbon fiber, and the like; a metal powder or metal fiber of copper, nickel, aluminum, silver, and the like; a conductive polymer such as a polyphenylene derivative; or a mixture thereof.

The current collector may include, e.g., aluminum (Al), but is not limited thereto.

The positive electrode 4 may be fabricated by a method including mixing a positive active material, a binder, and a conductive material to provide a positive active material slurry, and then coating the positive active material slurry on a current collector. The electrode manufacturing method is well known, and thus is not described in detail in the present specification. The solvent may include, e.g., N-methylpyrrolidone and the like, but is not limited thereto.

The electrolyte may include, e.g., a non-aqueous organic solvent and a lithium salt.

The non-aqueous organic solvent may serve as a medium for transmitting ions taking part in the electrochemical reaction of a battery.

The non-aqueous organic solvent may include, e.g., a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethyl acetate, methylpropionate, ethylpropionate, γ-butyrolactone, decanolide, valerolactone, mevalonolactone, caprolactone, and the like. Examples of the ether-based solvent may include dibutyl ether, tetraglyme, diglyme, dimethoxyethane, 2-methyltetrahydrofuran, tetrahydrofuran, and the like. Examples of the ketone-based solvent may include cyclohexanone and the like. Examples of the alcohol-based solvent may include ethyl alcohol, isopropyl alcohol, and the like. Examples of the aprotic solvent may include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture thereof. When the organic solvent is used in a mixture, a mixing ratio may be controlled in accordance with a desired battery performance.

The carbonate-based solvent may include a mixture of a cyclic carbonate and a linear carbonate. The cyclic carbonate and the linear carbonate may be mixed together in a volume ratio of about 1:1 to about 1:9. When the mixture is used as an electrolyte, the electrolyte performance may be enhanced.

In an implementation, the non-aqueous organic electrolyte may include the mixture of the carbonate-based solvents and an aromatic hydrocarbon-based solvent. The mixed carbonate-based solvent and the aromatic hydrocarbon-based solvent may be mixed together in a volume ratio of about 1:1 to about 30:1.

The aromatic hydrocarbon-based organic solvent may be represented by the following Chemical Formula 1.

[Chemical Formula 1]

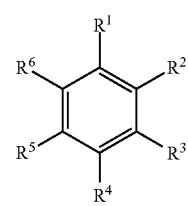

In Chemical Formula 1, $R^1$ to $R^6$ may each independently be hydrogen, a halogen, a C1 to C10 alkyl group, a C1 to C10 haloalkyl group, and a combination thereof.

The aromatic hydrocarbon-based organic solvent may include, e.g., benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and/or a combination thereof.

The non-aqueous electrolyte may further include, e.g., an additive including a vinylene carbonate, an ethylene carbonate-based compound of the following Chemical Formula 2, or a combination thereof in order to improve cycle life.

[Chemical Formula 2]

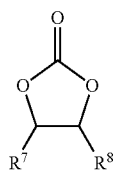

In Chemical Formula 2, $R^7$ and $R^8$ may each independently be hydrogen, a halogen, a cyano group (CN), a nitro group ($NO_2$), and/or a C1 to C5 fluoroalkyl group, provided that at least one of $R_7$ and $R_8$ includes a halogen, a cyano group (CN), a nitro group ($NO_2$), and a C1 to C5 fluoroalkyl group, and provided that both $R_7$ and $R_8$ are not hydrogen.

The ethylene carbonate-based compound may include, e.g., difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. An amount of the additive for improving the cycle life may be adjusted within an appropriate range.

The lithium salt may be dissolved in an organic solvent, may supply lithium ions in the battery, may facilitate basic operation of a rechargeable lithium battery, and may improve lithium ion transport between positive and negative electrodes. Non-limiting examples of the lithium salt may include a supporting salt including at least one of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalato) borate, LiBOB). The lithium salt may be used in a concentration ranging of about 0.1 M to about 2.0 M. Maintaining the concentration of the lithium salt at about 0.1 M to about 2.0 M may help ensure that electrolyte performance and lithium ion mobility are enhanced due to optimal electrolyte conductivity and viscosity.

The separator 3 may include, e.g., polyethylene, polypropylene, polyvinylidene fluoride, and multi-layers thereof, such as a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as, e.g., lithium ion batteries, lithium ion polymer batteries, and lithium polymer batteries, according to presence of a separator and kind of electrolyte used in the battery. The rechargeable lithium batteries may have a variety of shapes and sizes, and may include, e.g., cylindrical, prismatic, or coin-type batteries, and may be thin film batteries or may be rather bulky in size. Structures and fabricating methods for lithium ion batteries pertaining to this disclosure are well known in the art.

The following examples illustrate this disclosure in more detail. These examples, however, should not in any sense be interpreted as limiting the scope of this disclosure.

EXAMPLES

Example 1

Preparation of Negative Active Material for Rechargeable Lithium Battery

About 1 g of copper oxide (CuO) was added to about 100 g of soft carbon, dried in an oven set to about 120° C. for about 1 day, inputted into mechanofusion equipment (Hosokawa Micron Company), and rotated at about 3000 rpm for about 1 hour. A product acquired from the rotation was mixed with about 50 g of ethanol including about 5 g of citric acid dissolved therein and agitated for about 5 hours. The mixed solution was dried at room temperature and dried in an oven set to about 120° C. for about 5 hours. Then, a heat treatment was performed under a nitrogen atmosphere in an oven set to about 700° C. for about 5 hours. As a result, the negative active material for a rechargeable lithium battery of Example 1 was prepared. In the prepared negative active material for a rechargeable lithium battery, the thickness of a carbon thin film was about 8 nm.

Example 2

Preparation of Negative Active Material for Rechargeable Lithium Battery

About 10 g of soft carbon immersed by hydrogen peroxide for about 5 hours at room temperature was added to an aqueous solution containing about 0.1 g of copper nitrate trihydrate ($Cu(NO_3)_2 \cdot 3H_2O$) dissolved therein and agitated for about 1 hour. Heat treatment was performed thereon in a furnace set to about 300° C. under a nitrogen atmosphere for about 1 hour. The resultant was mixed with about 50 g of an acetone solution containing about 0.2 g of dihydroxy naphthalene dissolved therein and was agitated for about 1 hour. Heat treatment was performed on the mixed solution in a nitrogen atmosphere in a furnace set to about 300° C. for about 1 hour; and the powder acquired from the heat treatment was rinsed with acetone and then filtrated so as to produce a filter cake. A heat treatment was again performed on the acquired filter cake in an oven set to about 700° C. in a nitrogen atmosphere for about 5 hours. As a result, a negative active material for a rechargeable lithium battery of Example 2 was prepared. In the prepared negative active material for a rechargeable lithium battery, the thickness of the carbon thin film was about 10 nm.

Example 3

Preparation of Negative Active Material for Rechargeable Lithium Battery

A negative active material for a rechargeable lithium battery of Example 3 was prepared according to the same method as Example 2, except that nickel sulfate hexahydrate ($NiSO_4 \cdot 6H_2O$) was used instead of copper nitrate trihydrate. In the prepared negative active material for a rechargeable lithium battery, the thickness of the carbon thin film was about 14 nm.

Comparative Example 1

Preparation of Negative Active Material for Rechargeable Lithium Battery

A negative active material for a rechargeable lithium battery of Comparative Example 1 was prepared according to the same method as Example 1, except that the process of coating the surface of soft carbon and copper oxide with a carbon precursor by mixing with about 50 g of ethanol including about 5 g of citric acid dissolved therein and agitating for about 5 hours was not performed. In the prepared negative active material for a rechargeable lithium battery, no carbon thin film was formed.

Comparative Example 2

Preparation of Negative Active Material for Rechargeable Lithium Battery

A negative active material for a rechargeable lithium battery of Comparative Example 1 was prepared according to the same method as Example 2, except that about 2 g of hydrazine, which is a reducing agent, was added to the mixture of nitrate trihydrate ($Cu(NO_3)_2 \cdot 3H_2O$) and soft carbon, thereby educing copper particles, instead of performing a heat treatment on the mixture of copper nitrate trihydrate and soft carbon in a furnace set to about 300° C. in a nitrogen atmosphere for about 1 hour in Example 2. In the prepared negative active material for a rechargeable lithium battery, no carbon thin film was formed.

Comparative Example 3

Preparation of Negative Active Material for Rechargeable Lithium Battery

About 0.5 g of copper oxide was added to about 50 g of petroleum pitch. A heat treatment was performed in an oven set to about 400° C. for about 1 hour while being agitated. Then, a heat treatment was performed again under a nitrogen atmosphere in a furnace set to about 1000° C. for about 2 hours. Then, the product was pulverized. As a result, a negative active material for a rechargeable lithium battery of Comparative Example 3 was prepared. In the prepared negative active material for a rechargeable lithium battery, the thickness of the carbon thin film was about 900 nm.

Comparative Example 4

Preparation of Negative Active Material for Rechargeable Lithium Battery

About 0.2 g of copper oxide was added to about 20 g of petroleum pitch. A heat treatment was performed thereon in an oven set to about 200° C. for about 1 hour while being agitated. Then, about 100 g of soft carbon was added and a heat treatment was performed again under a nitrogen atmosphere in a furnace set to about 1000° C. for about 2 hours. Then, the product was pulverized. As a result, a negative active material for a rechargeable lithium battery of Comparative Example 3 was prepared. In the prepared negative active material for a rechargeable lithium battery, the thickness of the carbon thin film was about 600 nm.

Comparative Example 5

Preparation of Negative Active Material for Rechargeable Lithium Battery

A negative active material for a rechargeable lithium battery of Comparative Example 5 was prepared according to the same method as Example 1, except that about 100 g of graphite was used instead of about 100 g of soft carbon. In the prepared negative active material for a rechargeable lithium battery, the thickness of the carbon thin film was about 9 nm.

Examples 4 to 6

Fabrication of Rechargeable Lithium Battery Cell

Negative electrodes respectively including about 85 wt % of negative active materials of Examples 1 to 3, about 5 wt % of carbon black as a conductive material, and about 10 wt % of polyvinylidenefluoride (PVdF) as a binder were manufactured. 2016 coin half cells including lithium as a counter electrode and the negative electrode were manufactured. The above-manufactured half cells were sequentially referred to as rechargeable lithium batteries of Examples 4 to 6.

Comparative Examples 6 to 10

Fabrication of Rechargeable Lithium Battery Cell

Negative electrodes respectively including about 85 wt % of negative active materials of Comparative Examples 1 to 5, about 5 wt % of carbon black as a conductive material, and about 10 wt % of polyvinylidenefluoride (PVdF) as a binder were manufactured. 2016 coin half cells including lithium as a counter electrode and the negative electrode were manufactured. The above-manufactured half cells were sequentially referred to as rechargeable lithium batteries of Comparative Examples 6 to 10.

Analysis

Experimental Example 1

X-ray Diffraction (XRD) Analysis

Core particle X-ray diffraction analysis was performed on the negative active materials for rechargeable lithium batteries prepared according to Examples 1 to 3 and Comparative Examples 1 to 5.

The interplanar spacing (d002) at the (002) plane acquired as a result of X-ray diffraction analysis is shown in the following Table 1.

Experimental Example 2

Charge Efficiency (%) and Discharge Efficiency (%)

Charge and discharge were performed on the 2016 half cells of Examples 4 to 6 and Comparative Examples 6 to 10 in a variation of 1 C, 5 C, 20 C, and 50 C. The charge and discharge capacity percents at 5 C, 20 C, and 50 C with respect to 1 C were respectively calculated and are shown as charge efficiency (%) and discharge efficiency (%) in the following Table 1.

Experimental Example 3

Cycle-life

The cycle-life characteristics were measured by performing a cycle of charging and discharging the 2016 half cells of Examples 4 to 6 and Comparative Examples 6 to 10 at 6C 300 times, and the charge/discharge capacities at the $300^{th}$ cycle were determined in percent (%) based on the initial discharge capacity. The measured cycle-life characteristics are shown in the following Table 1.

TABLE 1

|  | (d002) (nm) | Carbon thin film thickness (nm) | Charge efficiency (%) | | | Discharge efficiency (%) | | | Cycle-life (%) |
| --- | --- | --- | --- | --- | --- | --- | --- | --- | --- |
|  |  |  | 5 C/1 C | 20 C/1 C | 50 C/1 C | 5 C/1 C | 20 C/1 C | 50 C/1 C | 6 C/6 C |
| Example 4 | 0.383 | 8 | 82 | 61 | 34 | 95 | 79 | 58 | 87 |
| Example 5 | 0.378 | 10 | 85 | 63 | 37 | 96 | 77 | 55 | 82 |
| Example 6 | 0.384 | 14 | 85 | 63 | 32 | 96 | 75 | 54 | 86 |
| Comparative Example 6 | 0.388 | 0 | 81 | 60 | 34 | 95 | 74 | 57 | 54 |
| Comparative Example 7 | 0.384 | 0 | 84 | 64 | 35 | 95 | 78 | 53 | 48 |
| Comparative Example 8 | 0.379 | 900 | 76 | 48 | 16 | 93 | 64 | 35 | 84 |
| Comparative Example 9 | 0.378 | 600 | 75 | 46 | 19 | 94 | 58 | 33 | 83 |
| Comparative Example 10 | 0.335 | 9 | 80 | 27 | —* | 93 | 54 | 10 | 18 |

*(impossible for charging)

As shown in Table 1, the rechargeable lithium batteries of Examples 4 to 6 exhibited high charge and discharge efficiencies at high rates and excellent cycle-life characteristics, compared with the rechargeable lithium batteries of Comparative Examples 6 to 10.

The rechargeable lithium batteries of Examples 4 and 5 and the rechargeable lithium batteries of Comparative Examples 6 and 7 are rechargeable lithium batteries using soft carbon with dispersed metallic material on the surface in the same method as a negative active material. However, in the negative active material of Comparative Examples 6 and 7, a carbon thin film was not formed on the surface. Thus, the metallic material did not properly adhere. Accordingly, the charge and discharge cycle-life at 6 C was degraded quickly. A load transferred onto the surface during the cycle-life assessment at a high rate was great. Thus, it is expected that the metallic material may have broken off.

The negative active materials of Comparative Examples 8 and 9 were prepared by dispersing the metallic material not in soft carbon, but rather in petroleum pitch. Here, carbon crystals were rapidly grown based on the metallic material in the course of the petroleum pitch being transformed into carbon. Thus, there was no directivity inside the crystals and the diffusion speed of lithium ions was relatively low. As a result, charge efficiency and discharge efficiency were low as well. In the negative active materials of Comparative Examples 8 and 9, carbon thin films were formed thick. Thus, interface resistances due to the metallic material on the surface were not lowered sufficiently.

The negative active material of Comparative Example 10 included core particles formed of graphite. Here the interplanar spacing (d002) at the (002) plane was relatively shorter than carbon core particles. Thus, lithium ions could not be easily intercalated and deintercalated. Accordingly, high-rate charge and discharge characteristics and cycle-life characteristic were poor.

By way of review, graphite may have high crystallinity and thus may have a large capacity. However, the graphite may have a small area of edge sites where lithium ions go in and out. Accordingly, resistance may occur when the lithium ions move. Thus, graphite may be inappropriate for high input and output. On the other hand, carbon that is not transformed into graphite may have low crystallinity and thus may have a small capacity and large irreversible capacity. However, the carbon that is not transformed into graphite may have many edge faces and lithium ions may go in and out quickly. Thus, it may be appropriate for high input and output.

When lithium ions are diffused into the inside of crystalline carbon through the edge face, charge transfer resistance that corresponds to an energy barrier at the interface may occur.

The embodiments provide a negative active material for a rechargeable lithium battery that exhibits excellent high power characteristics due to low charge transfer resistance and an improved cycle-life characteristic.

For example, the embodiments provide a negative active material for a rechargeable lithium battery that exhibits improved high power and cycle-life characteristics by reducing charge transfer resistance at the interface where lithium ions go in and out, thereby improving conductivity.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A negative active material for a rechargeable lithium battery, the negative active material comprising:
   carbon core particles, the carbon core particles having a crystallinity lower than a crystallinity of graphite;
   a metallic material on the carbon core particles; and
   a carbon thin film covering the carbon core particles and the metallic material, wherein:
   the carbon core particles have an interplanar spacing (d002) of 0.378 nm to about 0.40 nm at a (002) plane measured by X-ray diffraction (XRD) using a CuKα ray, and
   the carbon thin film has a thickness of about 1 nm to about 500 nm.

2. The negative active material as claimed in claim 1, wherein the carbon core particles include soft carbon, hard carbon, or a combination thereof.

3. The negative active material as claimed in claim 1, wherein the carbon thin film has a thickness of about 5 nm to about 350 nm.

4. The negative active material as claimed in claim 3, wherein the carbon thin film has a thickness of about 5 nm to about 100 nm.

5. The negative active material as claimed in claim 1, wherein the metallic material includes a metal including at least one of copper (Cu), nickel (Ni), silver (Ag), gold (Au), and platinum (Pt).

6. The negative active material as claimed in claim 1, wherein:
the metallic material includes a metallic material having a particle size of about 1 nm to about 100 nm, and
the metallic material having the particle size of about 1 nm to about 100 nm is included in an amount of more than about 80 wt. %, based on an entire weight of the metallic material.

7. A rechargeable lithium battery, comprising:
a negative electrode including a negative active material for a rechargeable lithium battery as claimed in claim 1;
a positive electrode; and
an electrolyte.

8. The negative active material as claimed in claim 1, wherein the carbon core particles include soft carbon.

9. The negative active material as claimed in claim 1, wherein the carbon core particles do not include graphite.

10. A method for preparing a negative active material for a rechargeable lithium battery, the method comprising:
providing a metallic material precursor on a surface of carbon, the carbon having a crystallinity lower than a crystallinity of graphite;
coating a surface of the carbon and the metallic material precursor with a carbon precursor; and
heat treating the metallic material precursor and the carbon precursor at a temperature of about 700° C. to about 1500° C. under an inert atmosphere for about 60 minutes to about 500 minutes,
wherein carbon core particles of the negative active material have an interplanar spacing (d002) of 0.378 nm to about 0.40 nm at a (002) plane measured by X-ray diffraction (XRD) using a CuK$\alpha$ ray.

11. The method as claimed in claim 10, wherein heat treating the metallic material precursor and the carbon precursor includes increasing the temperature to about 700° C. to about 1500° C. at a temperature increasing rate of about 1° C/min to about 5° C/min.

12. The method as claimed in claim 10, wherein the carbon includes soft carbon, hard carbon, or a combination thereof.

13. The method as claimed in claim 10, wherein providing the metallic material precursor on the surface of carbon includes mixing the carbon with the metallic material precursor using a dry combination method.

14. The method as claimed in claim 13, wherein the dry combination method includes a mechanochemical method, a dry milling method, or a combination thereof.

15. The method as claimed in claim 14, wherein the mechanochemical method includes a method of using mechano fusion (MF) equipment, a method using hybridizer equipment, a method using thetacomposer equipment, or a combination thereof.

16. The method as claimed in claim 10, wherein providing the metallic material precursor on the surface of carbon includes:
mixing the carbon and the metallic material precursor in a solution, and
heat treating the solution including the mixed carbon and metallic material precursor under an inert atmosphere for about 40 minutes to about 90 minutes at a temperature of about 250° C. to about 350° C.

17. The method as claimed in claim 10, wherein the metallic material precursor includes an oxide or a salt of a metal including at least one of copper (Cu), nickel (Ni), silver (Ag), gold (Au), and platinum (Pt).

18. The method as claimed in claim 10, wherein the metallic material precursor includes copper oxide (CuO), copper nitrate trihydrate ($Cu(NO_3)_2 \cdot 3H_2O$), nickel sulfate hexahydrate ($NiSO_4 \cdot 6H_2O$), or a combination thereof.

19. The method as claimed in claim 10, wherein heat treating the metallic material precursor and the carbon precursor includes transforming about 0.3 wt % to 1 wt %, based on a total weight of the carbon precursor, of the carbon precursor into a carbon thin film.

20. The method as claimed in claim 10, wherein the carbon precursor includes citric acid, dihydroxy naphthalene, or a combination thereof.

* * * * *